Aug. 30, 1927.  
D. HELLER ET AL  
1,640,656  
FRUIT PEELER  
Filed May 21, 1927
Fig. 1.
Fig. 2.
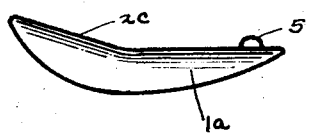
Fig. 3.
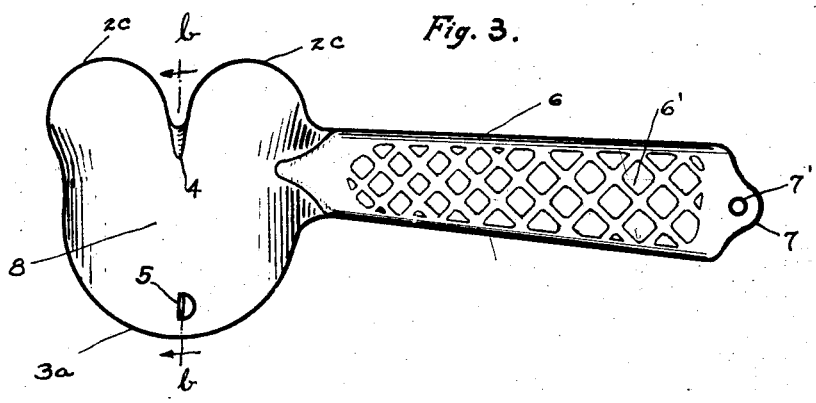
Fig. 4.
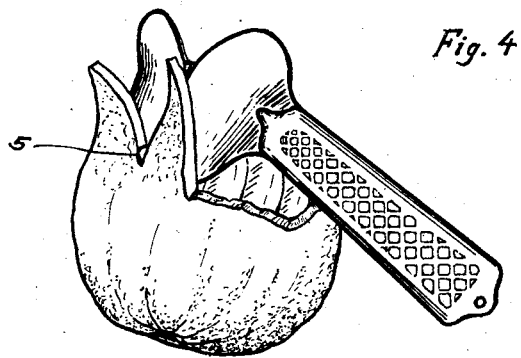
Inventors  
David Heller  
Alexander C. Parlini  
By Attorney Patented Aug. 30, 1927.

1,640,656

UNITED STATES PATENT OFFICE.

DAVID HELLER AND ALEXANDER C. PARLINI, OF NEW YORK, N. Y.

FRUIT PEELER.

Application filed May 21, 1927. Serial No. 193,161.

This invention relates to a device which is intended to peel oranges or fruits having rinds similar thereto.

The objects of this invention are to render a simple and economical construction, that is, which will peel a specimen of fruit, more quickly and efficiently than, a knife or other instrument now employed for this purpose.

Further objects of this invention will be apparent from the following description, wherein, Figure 1 is a front view of the invention.

Figure 2 is a side sectional view on the line $b$—$b$.

Figure 3 is a plan view of the invention.

Figure 4 is an isometric view showing the invention in actual use.

In the accompanying drawings 6 represents the handle of this invention which is made of a shape to offer a convenient grip for manipulation, this being provided with serrations 6' to prevent slipping and afford further insurance for positive gripping. This handle has a suitable extension 7 with a hole 7' for hanging same when not in use.

The main or active body of the invention 8 is composed of a section having the curvature $1^a$ which is more or less the shape of the fruit to be derinded, having an arcuate form $3^a$ as shown in Figure 3, and a slight lip 5 bent up at right angles and on the center line of curve $1^a$ slightly above arc $3^a$, chiefly for the purpose of segregating the rind as the peeling takes place. This body portion extends further as in Figure 3 and is formed into two lobes or ears $2^c$ which are separated on the center line by an angular notch 4.

The device as shown in use in Fig. 4 operates as follows: First the surface of the rind of the fruit to be peeled is broken by virtue of the angular notch 4 and the lobes $2^c$ serve to deflect the initial portion of peel thus cut away. Hence the broken surface offers suitable entry of the portion $3^a$ and operation continues as illustrated in Fig. 4, that is mainly, as follows:

The device is manipulated in a longitudinal direction, whereby arcuate portion $3^a$, tends to sever the rind from the fruit, and yet is sufficiently dull so as not to cut beyond the peel or rather into the body of the fruit proper.

The action of the lip or tooth 5 then becomes obvious. mainly that of splitting or destructing the removable portion of the fruit so as to facilitate the operation. The foregoing action being repeated several times as described will render any such fruit completely free from its outer covering.

While this present construction is fully described in this specification, it will be understood that the invention is not limited thereto, but may be otherwise variously modified and embodied without departing from the spirit thereof as set forth in the following claims.

What we claim is:

1. In a peeling instrument formed of one piece of material, having a handle member suitable for gripping in the palm of the hand terminating in a curved body portion approximate with the sphericity of the fruit, having a splitting member adjacent at one end located centrally of such curved portion, said curved portion terminating into two curved lobes, produced by splitting opposite end of body portion to form an angular cutting notch.

2. In a peeling device, formed of one piece of material, having a suitable handle, terminating in a curved portion having adjacent to one end of the surface a lip formed at one end at right angles and on the center line of such portion and curved lobes to deflect the removed portion, freeing and facilitating the action of the peeling instrument.

In witness whereof, we have hereunto signed our names.

DAVID HELLER.
ALEXANDER C. PARLINI.